United States Patent
Li et al.

(10) Patent No.: US 10,642,869 B2
(45) Date of Patent: May 5, 2020

(54) CENTRALIZED DATA RECONCILIATION USING ARTIFICIAL INTELLIGENCE MECHANISMS

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Jingyun Fan, Berkeley, CA (US); Abhishek Gunjan, Bangalore (IN); Madhura Shivaram, Bangalore (IN); Sawani Bade, Bangalore (IN); Suresh Venkatasubramaniyan, Bangalore (IN); Saumya Shekhar, Mumbai (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 195 days.

(21) Appl. No.: 15/991,744

(22) Filed: May 29, 2018

(65) Prior Publication Data

US 2019/0370388 A1   Dec. 5, 2019

(51) Int. Cl.
*G06F 17/00*   (2019.01)
*G06F 16/28*   (2019.01)
(Continued)

(52) U.S. Cl.
CPC ......... *G06F 16/288* (2019.01); *G06F 16/235* (2019.01); *G06F 16/24568* (2019.01);
(Continued)

(58) Field of Classification Search
CPC .. G06F 16/9535; G06F 16/951; G06F 40/242; G06F 16/24578; G06F 40/205; G06F 16/958
See application file for complete search history.

(56) References Cited

U.S. PATENT DOCUMENTS

2008/0005106 A1   1/2008   Schumacher et al.
2015/0286713 A1   10/2015  Zhang et al.
(Continued)

OTHER PUBLICATIONS

Verykios et al., "Automating the approximate record-matching process", 1999.
(Continued)

*Primary Examiner* — Truong V Vo
(74) *Attorney, Agent, or Firm* — Mannava & Kang, P.C.

(57) ABSTRACT

A centralized data reconciliation system processes at least two data streams transmitting data related to one of a plurality of processes and executes a data reconciliation procedure. Unmatched data records identified during the data reconciliation procedure are further categorized into categorized records based on various reason categories and irreconcilable records which could not be categorized into the reason categories. The irreconcilable records are flagged for user input. The user input is recorded to further train the data reconciliation system. The at least two data streams are initially converted into self-describing data streams from which the entities and entity attributes are extracted using the data models received from the data streams. The data records from the first and second self-describing data streams are mapped. The matched pairs and unmatched pairs are selected from the mappings based on respective confidence scores that are estimated in accordance with the rules of data reconciliation.

20 Claims, 10 Drawing Sheets

(51) Int. Cl.
  *G06N 5/02* (2006.01)
  *G06N 20/00* (2019.01)
  *G06F 16/23* (2019.01)
  *G06F 16/2455* (2019.01)
  *G06F 16/903* (2019.01)
  *G06F 40/295* (2020.01)

(52) U.S. Cl.
  CPC ...... *G06F 16/90344* (2019.01); *G06F 40/295* (2020.01); *G06N 5/025* (2013.01); *G06N 20/00* (2019.01)

(56) References Cited

U.S. PATENT DOCUMENTS

| | | |
|---|---|---|
| 2016/0371435 A1 | 12/2016 | Pauletto |
| 2017/0039553 A1 | 2/2017 | Ghatage et al. |
| 2017/0053357 A1 | 2/2017 | Bowman et al. |
| 2017/0286489 A1 | 10/2017 | Dantressangle et al. |
| 2018/0101761 A1* | 4/2018 | Nelson ................ G06Q 10/109 |

OTHER PUBLICATIONS

IP Australia, "Examination report No. 1 for standard patent application, Australia Application No. 2019203255", dated Mar. 2, 2020, 7 pages.

\* cited by examiner

CENTRALIZED DATA RECONCILIATION USING ARTIFICIAL INTELLIGENCE MECHANISMS

BACKGROUND

Data reconciliation is a process that is typically implemented for comparing data records from a source data system to data records in a target data system thereby ensuring that the information from the source data system has been conveyed accurately to the target data system. During data transfer, it is possible that mistakes are made in the mapping and transformation logic. Additionally, runtime failures such as network outages or broken transactions may lead to issues such as missing records, incorrect values, duplicated records, badly formatted data and the like. If such errors are not corrected, then incorrect data can be stored thereby causing malfunctioning of systems which leads to inaccurate insights which may affect customer service.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
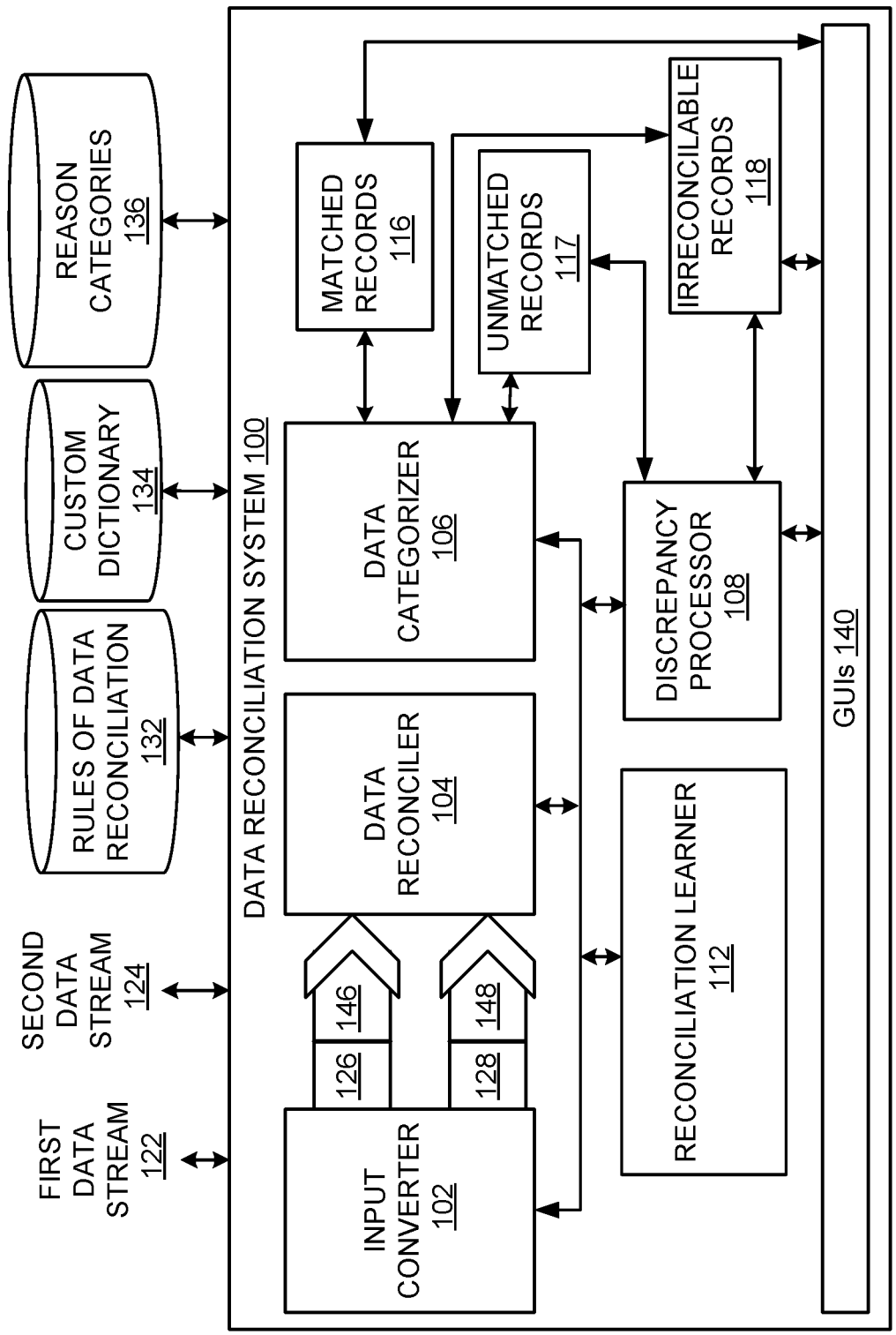
FIG. 1 shows a block diagram of a data reconciliation system in accordance with examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

According to one or more examples described herein, a centralized data reconciliation system is disclosed which enables implementing data reconciliation procedures for multiple processes. The data reconciliation system receives at least two data streams including at least a first data stream from a source data system and a second data stream from a target data system so that the data records from the source data system are matched to the data records of the target data system. The received first and second data streams are initially converted into at least a first self-describing data stream and a second self-describing data stream respectively. The self-describing data streams not only include data records or line items but also data models representing metadata about the data records. The entities and entity attributes are extracted from the self-describing data streams using the data models.

The data reconciliation system maps the entities and entity attributes from the first self-describing data stream to the entities and the entity attributes of the second self-describing data stream. Techniques such as but not limited to, string similarity and other natural language processing (NLP) techniques are used for the mappings of the entities and the entity attributes. A custom dictionary includes terminology associated with each of the multiple processes such as but not limited to entities, entity relationships, synonyms or variations in terminology that can be used for the entities/entity relationships in the contexts of the multiple processes. In an example, techniques such as knowledge graphs can be used so that the custom dictionary is dynamically updatable in response to received user input. Therefore, the data reconciliation system is able to process data with differing formats and terminology.

The data reconciliation system determines the extent of matching between the data records of the multiple self-describing data streams based on the rules of data reconciliation. The rules of data reconciliation can be explicitly provided by users engaged in the various processes for which the data reconciliation is being executed. The rules can also be automatically learnt via labelled data or by implicit training wherein data complying with a rule to be learnt is supplied to Artificial Intelligence (AI) elements such as decision trees which are used to automatically learn the rules.

A confidence score, based at least on the rules of data reconciliation, is estimated for each of the mappings between the entities/entity attributes in the first self-describing data stream and the second self-describing data stream. The confidence score can be indicative of the extent or degree of match in the mappings between the at least two self-describing data streams. The degree of matching can be determined on a number of factors such as but not limited to, the number of rules the mapping complies with normalized by the total number rules the mapping is supposed to comply with to achieve a perfect match, the extent to which the mapping complies with each rule, compatibility or similarity of the mapped data types and the like. The confidence score of each mapping is compared with a threshold confidence value to separate matched pairs of values or matched data records from unmatched values or unmatched data records.

A reconciliation report can summarize the matched data records. The unmatched records are further categorized into one or more reason categories using Artificial Intelligence (AI) methodologies such as but not limited to, classifiers or decision trees. The classifiers can be trained using data including unmatched records labeled with reason categories in an example. Reason categories can include various reasons for failure of the data reconciliation process. Generally, the reasons for data reconciliation can be domain-specific. In another example, the classifiers can be trained via user input even as the data reconciliation system is online. For example, if the user provides input that an unmatched record is wrongly categorized or can be categorized into additional reason categories, such input can be automatically used to train the classifiers employed for executing the unmatched record categorization.

The unmatched records which could not be categorized into the reason categories are further processed as irreconcilable records. One or more hypotheses are automatically generated for the unmatched records based at least on the data records that were used for the mappings, the rules of data reconciliation that were employed for the mappings, the rules that the mappings did not comply with, and other machine errors such as missing values or incomplete values in the data records, incompatible data types or data formats etc. Confidence levels are estimated for the hypotheses and compared with a hypotheses confidence threshold. Hypotheses can be separated into those with high confidence levels and those with medium and low confidence levels based on the comparison with the hypotheses confidence threshold. The reasons and recommendations are generated for the hypotheses with high confidence levels. The hypotheses with medium to low confidence levels are marked for user input.

User input can address the irreconcilable records with medium to low hypotheses confidence levels in various ways. In an example, the received user input can enable reconciling the irreconcilable records. In an example, the user input can change one or more entities or entity attributes of the irreconcilable records thereby enabling reconciliation of the irreconcilable records. The user input can also be related to reconciled data records so the data records which are reconciled erroneously are changed to reconcile differently. The user input thus received can be recorded and used to train one or more elements of the data reconciliation system to improve accuracy of the reconciliation processes.

The data reconciliation system as disclosed herein enables data reconciliation in a plurality of processes wherein data of various data types and in different data formats is to be reconciled. Moreover, the data reconciliation system enables matching between more than two data streams enabling 3-way or 4-way matching in one-to-one, many-to-one, many-to-many and one-to-many matches. Elements of the data reconciliation system such as the conversion of the data streams received from the source and target data systems to self-describing data streams, usage of a custom dictionary and automatic rule learning from labeled data enable externalizing the data reconciliation system. These aspects provide for technical improvements which improve data reconciliation systems which would otherwise need separate reconciliation systems for each of the plurality of processes thereby resulting in duplication of functions and difficulties in implementing newer capabilities as such newer capabilities would require separate updates to each of the reconciliation systems. The continuous learning framework associated with the data reconciliation system eliminates the need for separate training sessions as the recorded user input is used to continuously improve the data reconciliation system even as it executes its data reconciliation procedures.

FIG. 1 is a block diagram of the data reconciliation system 100 in accordance with examples disclosed herein. The data reconciliation system 100 reconciles data records from multiple data streams including a first data stream 122 which can be a source data stream and a second data stream 124 which can be a target data stream. The first data stream 122 and the second data stream 124 can originate from different data systems. Those data records from the first data stream 122 which are matched to the data records from the second data stream 124 are output as matched records 116. The data records from the first data stream 122 which could not be matched to the data records in the second data stream 124 are output as unmatched records which are further categorized into different reason categories 136 as described further herein. The data records from either of the data streams 122 and 124 which could neither be matched nor categorized into the reason categories 136 are collected as irreconcilable records 118. A discrepancy processor 108 uses AI techniques to determine one or more of the reasons and remedies for the discrepancies that caused the unmatched records 117 and generate reports with the reasons and remedies that can correct the discrepancies and match the records. When the reasons and/or remedies cannot be determined with high-enough accuracy that meets an accuracy threshold for one or more of the unmatched records 117, then such irreconcilable records 118 can be flagged for user input. The user input thus received can be employed for further training of the data reconciliation system 100 by the reconciliation learner 112. GUIs 140 are included with the data reconciliation system 100 to enable users to view reconciliation summaries of matched pairs, reports and other outputs that can be provided by the data reconciliation system 100.

The data streams 122 and 124 received by the data reconciliation system 100 may have data records of different data types and in different data formats. The data records can include entities having different attributes. The data steams 122 and 124 can include data sources providing structured and/or unstructured data of different formats such as but not limited to .pdf documents, spreadsheets, emails, scanned images or other hard copies in non-searchable formats, reports, voice recordings such as phone conversations, documents including markup such as .html or .xml, word processing documents, presentations, and the like. The data sources providing the data streams 122 and 124 can pertain to records of checks issued on a bank account/bank statements, remittance advice, account receivables, invoices, purchase orders, goods received and the like. The input converter 102 converts the data streams 122 and 124 respectively into a first self-describing data stream 126 and a second self-describing data stream 128. Each of the self-describing data streams 126 and 128 include data records which may exist in the form of name value pairs for example. The self-describing data streams 126 and 128 also include respective data models 146 and 148 that represent metadata regarding the data records or the data models 146 and 148 convey the type of information being received in the self-describing data streams 126 and 128. In an example, the self-describing data streams 126 and 128 can be based on Avro—a data serialization framework that uses JavaScript Object Notation (JSON) for defining data types and serializes data in a compact binary format. The self-describing data streams 126, 128 therefore include entities of various data types including string data types, numeric data types such as int, float, long and the like. The data types can also include complex types such as record, array, enum and the like. It can be appreciated that only two data streams are shown herein by the way of illustration and that the data reconciliation system 100 can handle matching between more than two data streams by decomposing higher order 3-way or 4-way matches into simpler 2-way matches as further described herein. In an example, intermediate data streams including data sources such as, sub-ledgers for example, can be processed via the higher order matches.

The self-describing data streams 126 and 128 are accessed by the data reconciler 104 which identifies the entities and entity attributes received from the source and target data systems. The data reconciler 104 is configured to match entities from the first data stream 122 to the entities in the second data stream 124 thereby producing matched pairs. The entities in the data streams 122 and 124 can include dates, description of line items, reference numbers, amounts including withdrawals, balances, deposits, names and addresses of people, organizations, unique document identifying indicia such as statement or invoice numbers, goods, services and the like. The data reconciler 104 can enable identifying not only 1:1 matches but can also identify many to one (N:1), one to many (1:N), a self-match and a prior period match wherein a current value from the data streams 126 or 128 is matched with the previous value(s).

Although similar data types may be used for the same entity (for e.g., numeric data types such as int can be used for amounts), it may happen that the same entities in the first data stream 122 may be referred to with different strings/terms in the second data stream 124. For example, an account number can be referred to as "A/C No." in one data stream while the other data stream can refer to the same account number as "Account No.". Therefore, attempts to directly identify a string match for the account entity fail for the first self-describing data stream 126 and the second self-describing data stream 128.

However, a custom dictionary 134 can be employed in this case to identify the variations that may be used on the account number entity in the different data sources. In an example, the custom dictionary 134 can include knowledge graph representations that describe real-world entities and their interrelations organized as a graph. The knowledge graphs define possible classes and relations of entities in a schema and allow for potentially interrelating arbitrary entities with each other in various domains. The normalization of the attribute and parameter names can be based on knowledge graphs so that related parameters and attributes can be correlated even though the parameters and attributes may not be identical or even in the same language.

The different variations that can be used for identifying entities and the entity attributes can be fed into the custom dictionary 134 by users. However, the data reconciliation system 100 also includes a reconciliation learner 112 which enables automatically updating the custom dictionary 134 whenever relevant user input is received in response to the irreconcilable records 118 as detailed further herein. The data reconciler 104 can be configured to further obtain confidence scores for each data record in the first self-describing data stream 126 and the second self-describing data stream 128 based on the extent of matching obtained between the data records in the two self-describing data streams 126 and 128.

The confidence scores for the data records in the two self-describing data streams are employed by the data categorizer 106 to identify matched records 116 and unmatched records 117. The data categorizer 106 identifies the matched records 116 as the data records from the two self-describing data streams 126 and 128 with confidence scores higher than a match threshold. Unmatched records 117 are identified as the data records from the two self-describing data streams 126 and 128 wherein confidence scores failed to meet the match threshold. In an example, the unmatched records 117 from the two self-describing data streams 126 and 128 can be classified into reason categories 136 based on one or more of the identities of the entities, entity attributes and the rules of data reconciliation 132 that were not matched or fulfilled for the unmatched records 117. For example, if the data reconciliation system 100 is employed for matching financial data, reason categories 136 can include categories such as but not limited to, outstanding checks, deposits in transit, bank service charges, errors on books, errors by the bank, electronic charges on the bank statement not yet recorded on the books, electronic deposits on the bank statement not yet recorded on the books and the like. In an example, a subset of the unmatched records 117 termed as irreconcilable records 118 can exist which cannot be classified into the reason categories 136.

The discrepancy processor 108 accesses the unmatched records 117 and determines hypotheses on the errors that caused the data records to remain unmatched. In an example, one or more of errors on unmatched entity attributes or values or the rules of data reconciliation 132 that were not complied with by the irreconcilable data records 118 can be used to frame the hypotheses. For example, when the data records pertain to a depreciating asset, the cost of the asset may reduce but the reducing cost may not have been built into the rule for calculating the asset value in one of the data sources. As a result, data records pertaining to the asset value may not match between the two data streams 126 and 128. A hypotheses based on the mismatch in the asset value can be determined based for example, on the entity name—which is the asset and entity attribute which is the asset value and a failed data reconciliation rule related to equality of asset value. A reason for failure and a recommendation to check the asset value can also be included in a discrepancy report generated by the discrepancy processor 108.

Figure 2:
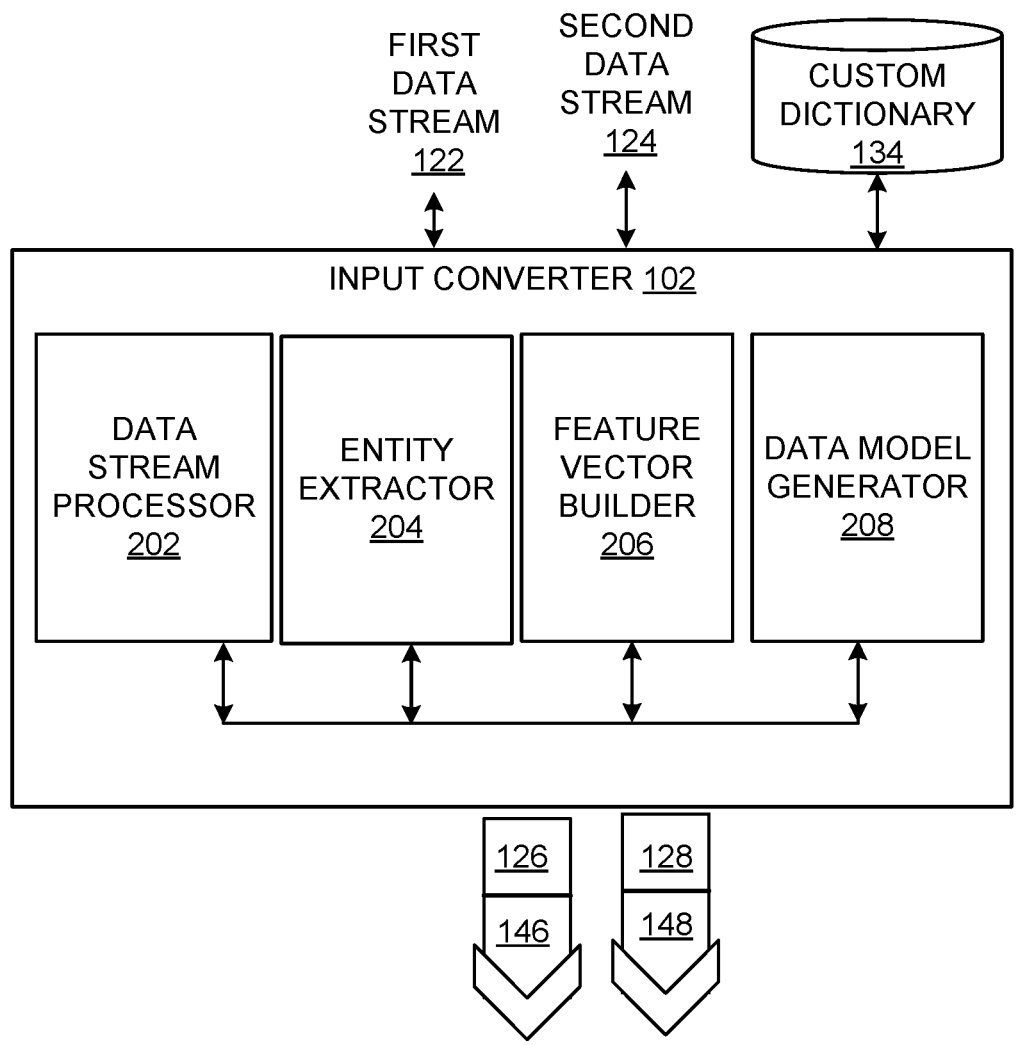
FIG. 2 shows a block diagram of an input converter in accordance with examples disclosed herein.

FIG. 2 shows a block diagram of the input converter 102 in accordance with examples disclosed herein. The input converter 102 receives the data streams 122 and 124 originating at a source and a destination data systems (not shown) respectively and converts them into self-describing data streams that include data models which represent the information in the data streams. In the examples disclosed herein, the data reconciliation system 100 is generalized to handle data reconciliations of various processes including but not limited to, procure-to-pay (PTP), record-to-report (RTR), order-to-cash (OTC) and the like. The data reconciliation system 100 is therefore configured to handle various types of data streams related to the different processes. The data streams 122, 124 can include data sources such as but not limited to, purchase orders, bank statements, general ledgers, remittance advises, invoices, checks, wire transfer statements, journals, acknowledgement receipts such as for goods received and the like. Each of the data streams include various entities with different attributes of various data types. Therefore, the type of data that the data reconciliation system 100 is required to process from time to time is highly varied. A data stream processor 202 initially processes the documents, images, tables, spreadsheets or data structures received via the data streams 122 and 124 by parsing, filtering, removing stop words, parts-of-speech (POS) tagging and other NLP techniques and AI methods such as Optical Character Recognition (OCR) to produce various tokens. For example, a bank statement when processed by the data stream processor 202 produces tokens pertaining to a central entity (an individual or an organization) who owns the corresponding bank account with attributes such as address, account number, number of credits, number of debits, total number of line items wherein each line item can also be characterized as an entity having attributes such as name, description, date, amount and the like. In an example, the bank statement can also be modeled as an entity with attributes such as date, total amount, statement number, entity or account number pertaining to the statement, number of line items and the like. The tokens thus produced can also include the various data values included in the data records or the line items of the bank statement.

An entity extractor 204 accesses the custom dictionary 134 to recognize or identify entities and entity attributes from the tokens. A feature vector builder 206 accesses the information regarding the entities and the entity attributes to build feature vectors corresponding to the entities and their various attributes. For example, feature vectors corresponding to the central entity and its attributes, each of the line items, the bank statement and the like are generated using various programming techniques such as but not limited to bag-of-words models and the like. A data model generator 208 can employ the feature vectors to generate data models 146 and 148 pertaining to the various entities represented by the feature vectors. The data models 146 and 148 are transmitted with the data records (i.e., values included in the data records) extracted from the data streams 122 and 124 via respective self-describing data streams which include a first self-describing data stream 126 and a second self-describing data stream 128.

Figure 3:
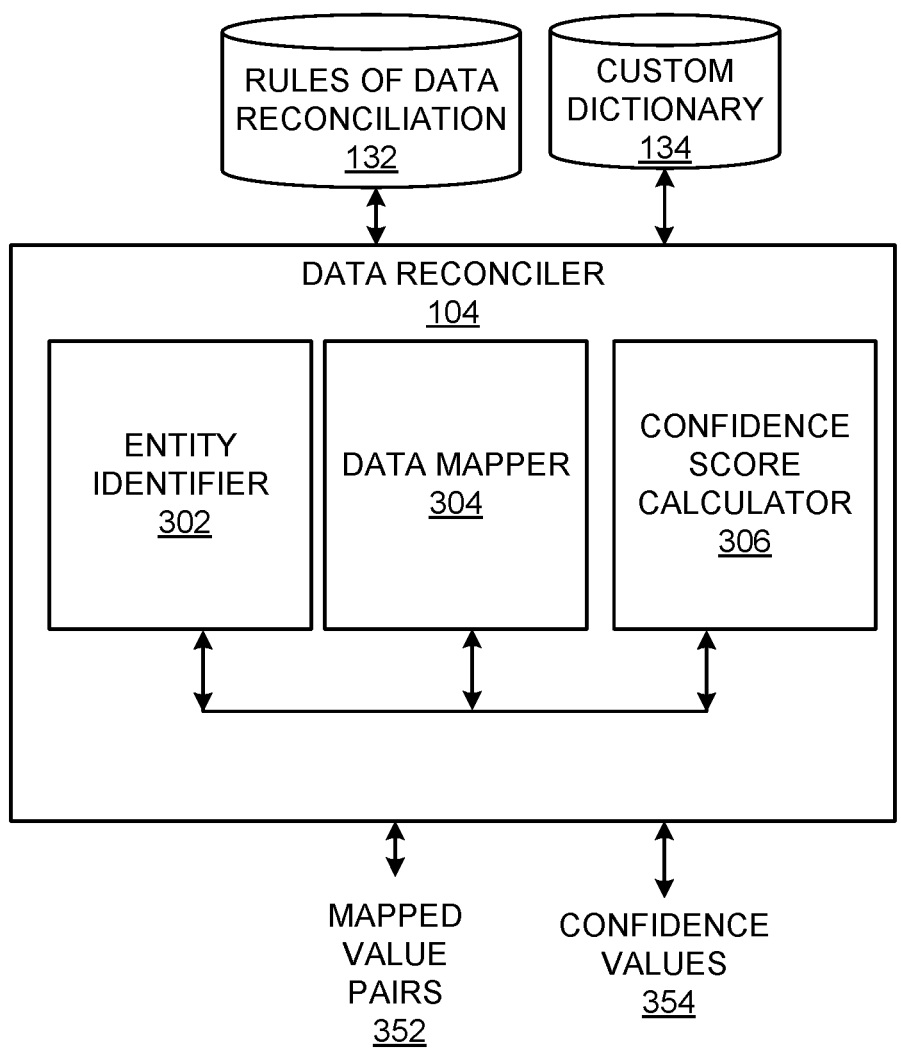
FIG. 3 shows a block diagram of a data reconciler in accordance with examples disclosed herein.

FIG. 3 shows a block diagram of the data reconciler 104 in accordance with examples disclosed herein. The data reconciler 104 receives entities, entity attributes via the data models 146, 148 in the self-describing data streams 126, 128 along with the data values in order to match values from the first self-describing data stream 126 and the second self-describing data stream 128. Accordingly, an entity identifier 302 identifies the various entities, entity attributes and values from the line items in the self-describing data streams 126, 128 using for example, the data models 146 and 148. As mentioned above, the same entity can be referred to with different terminologies in different documents as the data reconciliation system 100 is configured to reconcile data for different processes. For example, a total amount can also be referred to as billed amount, total etc. The custom dictionary 134 maps various entities and entity attributes to their likely variations by implementing information retrieval (IR) techniques within the data reconciliation system 100. The entity identifier 302 therefore, not only obtains entities from the self-describing data streams 126 and 128 but also retrieves the tokens or terms related to the entities from the custom dictionary 134. Therefore, based on the rules, either the entity or its equivalent term as retrieved from the custom dictionary 134 can be used for the matching. In an example, the custom dictionary 134 can be dynamically updateable so that any user input regarding unmatched items is analyzed and if the user input pertains to an update for an entity terminology then the custom dictionary 134 is updated with such user input. In an example, NLP techniques such as co-occurrences of terms and the like can be employed to automatically update the custom dictionary 134.

The rules pertaining to the entities obtained from the data streams 126 and 128 by the entity identifier 302 are retrieved by the data mapper 304 from a data store having the rules of data reconciliation 132 stored thereon. In an example, the rules can be obtained from users involved with the processes and fed to the data store including the rules of data reconciliation 132. In an example, the rules can be automatically framed when the data reconciliation system 100 is trained with the appropriate data which includes examples with match/mismatch labels. The rules can also be learnt via recording user input as detailed herein. In an example, the data reconciliation system 100 can be configured with automatic rule learning capability so that when provided with unmatched data, the rules are learnt from the data itself.

One or more of the rules of data reconciliation 132 that are retrieved by the data mapper 304 can be employed to compare the data from the first self-describing data stream 126 with the data from the second self-describing data stream 128. If more than two data streams are received by the data reconciliation system 100, the 3-way or 4-way matching process is decomposed into multiple 2-way matching processes. The matching between pairs of the data streams corresponding to each of the 2-way matches can be executed in serial or in parallel as described herein. The data mapper 304 can parse the rules which can be framed in a natural language to obtain conditions that are to be fulfilled by the entities or entity attributes. The conditions can be verified via operations including but not limited to mathematical operations, logical operations (e.g., >, =, <, < >, etc.), string comparison operations, and/or other programming constructs such as but not limited to IF conditions, IF-THEN-ELSE loops and the like. The programming constructs used for verifying compliance of the value pairs with the rules can depend on the particular programming platform being used for the data reconciliation system 100.

A confidence score calculator 306 calculates a respective confidence score for each matched pair from the data mapper 304. The degree of matching between a pair of values or records is indicated as a confidence score. In an example, each value from the first self-describing data stream 126 is compared with each of the values in the second self-describing data stream 128 based on the retrieved rules. The values can be compared/mapped using NLP techniques such as string/sub-string comparisons, comparisons of numerical values, dates/time and the like. The relations between the compared values can be evaluated for compliance with the retrieved rules in order to determine the extent of matching. In an example, the confidence score can be determined based on the number of rules that are retrieved for determining the match and the number of rules that are actually satisfied by the pair of values being compared. A higher confidence score can indicate greater compliance with the rules such as complying with more rules than other value pairs or numerical attribute values being closer and hence the value pair forms a superior match. Conversely a lower confidence score can indicate that the pair of values do not match. The confidence score therefore provides a confidence measure regarding the degree of match between the values in the corresponding pair.

When a value from the first self-describing data stream 126 is compared with each value in the second self-describing data stream 128, a confidence score can be generated for each of the comparisons. A value from the second self-describing data stream 128 which provides the highest confidence score can be selected as the matching value. Subject to the rules of data reconciliation, the matches determined can include one-to-one, many-to-one, one-to-many, many-to-many, a self-match and a prior period match. Each of one-to-many, many-to-one and many-to-many can also be reduced to one-to-one matchings and each of the matches can have a respective confidence score. The mapped value pairs 352 and the respective confidence scores 354 are thus output by the data reconciler 104.

Figure 4:
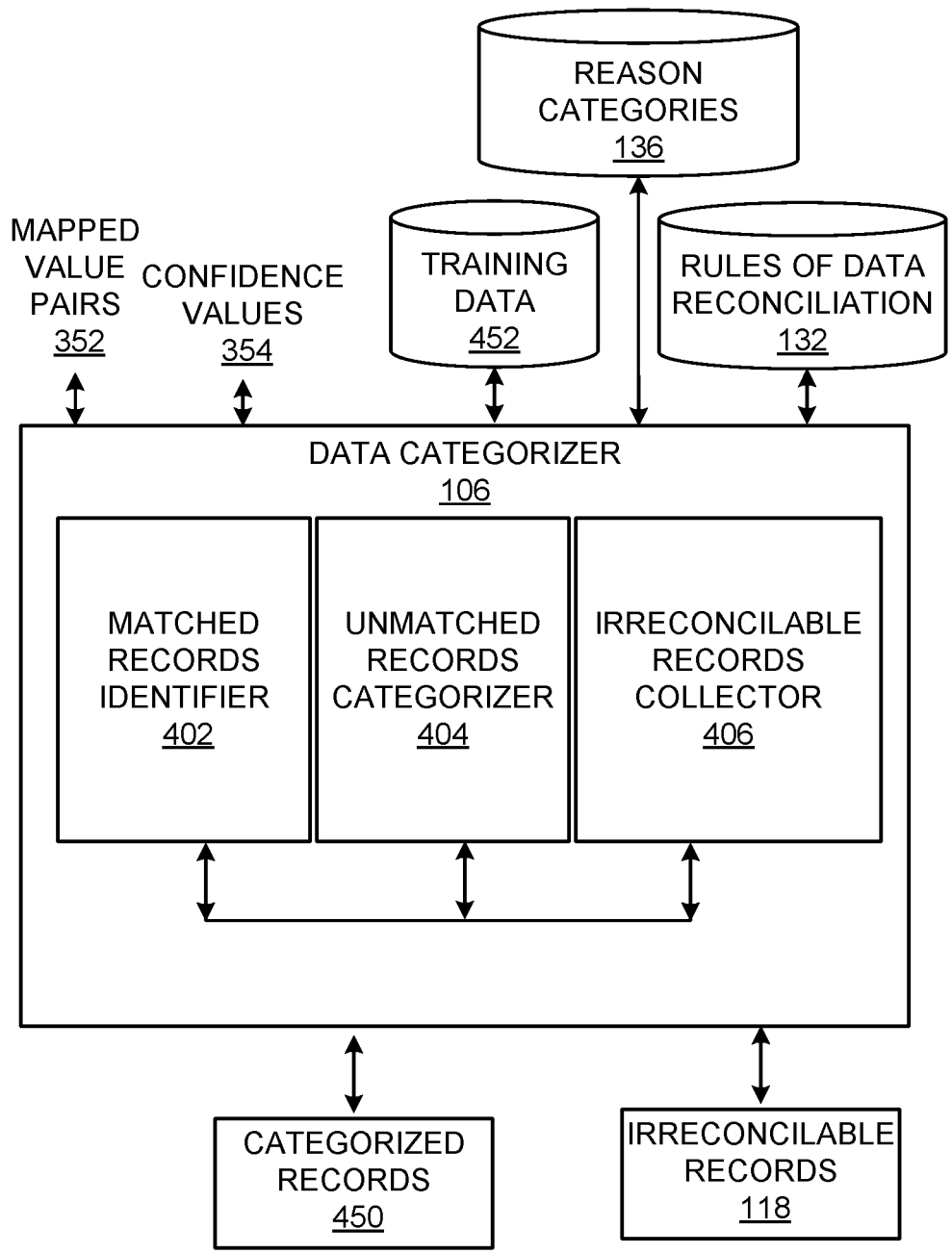
FIG. 4 shows a block diagram of a data categorizer in accordance with examples disclosed herein.

FIG. 4 shows a block diagram of the data categorizer 106 in accordance with examples disclosed herein. The data categorizer 106 accesses the pairs of values and the related confidence scores and classifies the pairs of values into matched and unmatched values or unmatched data records and enables further processing of the unmatched values. The data categorizer 106 includes a matched records identifier 402, unmatched records categorizer 404 and an irreconcilable records collector 406. The matched pairs of values 352 and their corresponding confidence scores 354 are received by the matched records identifier 402 which compares the confidence scores 354 with a predetermined match threshold. A subset of the matched value pairs 352 that have confidence scores meeting the predetermined match threshold are selected as the matched records 116 or reconciled pairs. The confidence scores can meet the match threshold based on the definition of the match threshold. In one example, the confidence scores having values higher than the match threshold can be classified as the reconciled pairs In another example, the confidence scores having values lower than the match threshold can be classified as reconciled pairs. In an example, training data 452 including labelled data records can be employed to train the matched records identifier 402 in identifying mappings between the first and the second self-describing data streams 126, 128 that can be classified as matched records 116.

In either case, the values in value pairs having confidence scores that do not meet the match threshold are selected by the unmatched records categorizer 404 for categorization into one or more of the reason categories 136. The unmatched records categorizer 404 can use matching techniques such as string matching or other AI techniques such as NLP, for categorizing the unmatched values. In an example, multi-class classification technique can be employed to categorize the unmatched records 117 into various reason categories 136. AI methodologies such as but not limited to, decision trees, can be employed to categorize the unmatched records 117. Various elements of an unmatched value and combinations thereof can be used for the categorization. By the way of illustration and not limitation, the entity name, entity attribute, the rules of data reconciliation 132 that the value failed to comply with can be employed in categorizing the unmatched values. Therefore, the individual values or data records from both the first self-describing data stream 126 and the second self-describing data stream 128 can be separately classified into the reason categories 136. The unmatched records or values which could not be classified into any of the reason categories 136 are flagged as irreconcilable records 118 by the irreconcilable record collector 406. The irreconcilable records 118 are further processed for collecting human intervention.

Figure 5:
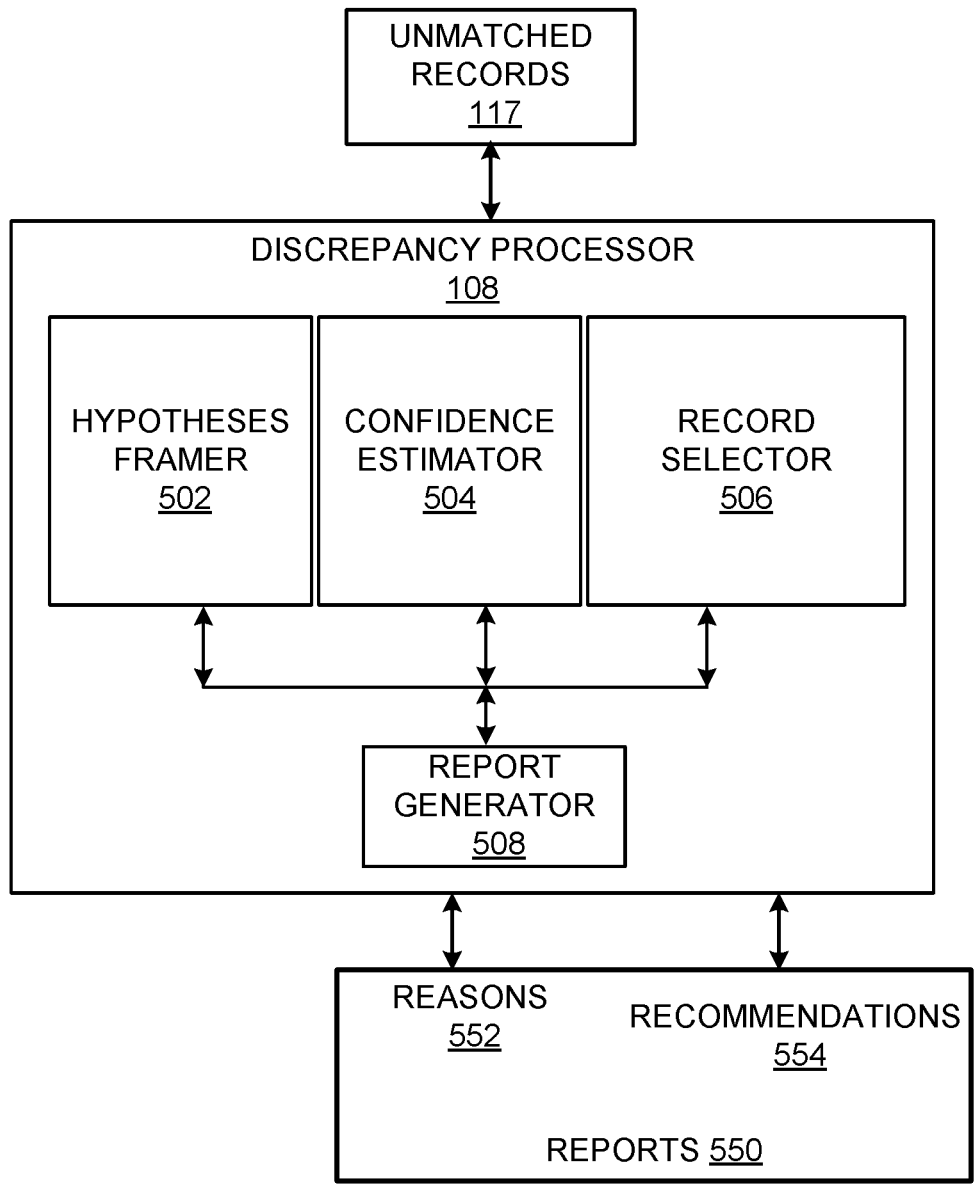
FIG. 5 shows a block diagram of a discrepancy processor in accordance with examples disclosed herein.

FIG. 5 shows a block diagram of the discrepancy processor 108 in accordance with examples disclosed herein. The discrepancy processor 108 receives the unmatched records 117, frames hypotheses related to the unmatched records 117 and generates reports 550 based on the confidence levels associated with the hypotheses. The reports 550 can clarify the reasons for the unmatched records 117 and remedies that can be implemented to reconcile the unmatched records 117. If a subset of the unmatched records 117 exists for which, no credible or valid hypothesis can be generated, then the subset of records are further categorized as the irreconcilable records 118 for user input/intervention. The data reconciliation system 100 is configured to learn from such user input as detailed herein.

The discrepancy processor 108 includes a hypotheses framer 502 which enables generating a hypotheses for the unmatched records 117. In an example, one or more of the hypotheses can be framed using one or more of the entity names, entity attributes that could not be matched, the rules of data reconciliation 132 that an irreconcilable record failed to fulfill and the reason categories 136. Referring to a real-world example, line item mismatches between a purchase order and an invoice can result in a hypothesis that the purchase order is overspent. Similarly, comparisons of sale amounts in different data streams can result in a hypothesis of there is a mismatch regarding the total sales amount. In another example, the freight costs may not have been included in the purchase order. Again comparisons of the purchase order and the invoice from the different data streams can result in the entity associated with the freight from the invoice remaining unmatched with an entity from the purchase order. Therefore, a hypotheses regarding the non-inclusion of freight in the purchase order can be generated by the hypotheses framer 502 using a combination of mathematical/logical operators. In an example, a report generator 508 can be configured to access templates for generating the reports 550 which include the reasons 552 and recommendations 554 for the unmatched records 117.

The confidence estimator 504 estimates the confidence levels or discrepancy confidence scores associated with the generated hypotheses from low, medium and high levels. In an example, the confidence levels can be estimated based on the kind of matching technique used. The confidence levels can be estimated as high, medium or low for a given hypothesis based on the accuracy with which the mismatches (matches with low confidence scores) or unmatched values (matches with zero confidence scores) between the two data streams 122 and 124 were identified for an irreconcilable record. The differences between the amounts being compared can be another factor that affects the confidence levels or the discrepancy confidence scores for the hypotheses associated with the irreconcilable records. When the difference between the amounts being compared is large, then the corresponding hypothesis can have a medium/low confidence level and conversely if the difference is lower, the corresponding hypothesis can be identified as having a higher confidence level. For the unmatched records 117 having hypotheses with high confidence scores (e.g., the categorized records 450), the reasons 552 for the mismatches or the unmatched values and recommendations 554 to resolve or reconcile the mismatched or the unmatched values can be generated. If the mismatches or the unmatched values could not be accurately identified, then the confidence estimator 504 can assign low or medium score for the particular unmatched record which is categorized part of the irreconcilable records 118. The irreconcilable records corresponding to the hypotheses with low and medium confidence values are selected and flagged by the record selector 506 for user intervention. The user intervention can include user actions such as explicitly categorizing the irreconcilable records with low discrepancy confidence scores into one or more reason categories 136 or manually matching the irreconcilable records of one data stream to another data stream so that they are now included in the reconciled records or make some other changes to the data records themselves etc. Each of these user actions can be employed by the reconciliation learner 112 to further train an appropriate element of the data reconciliation system 100 and/or make changes to one or more elements such as the rules of data reconciliation 132, the custom dictionary 134 and the reason categories 136.

Figure 6:
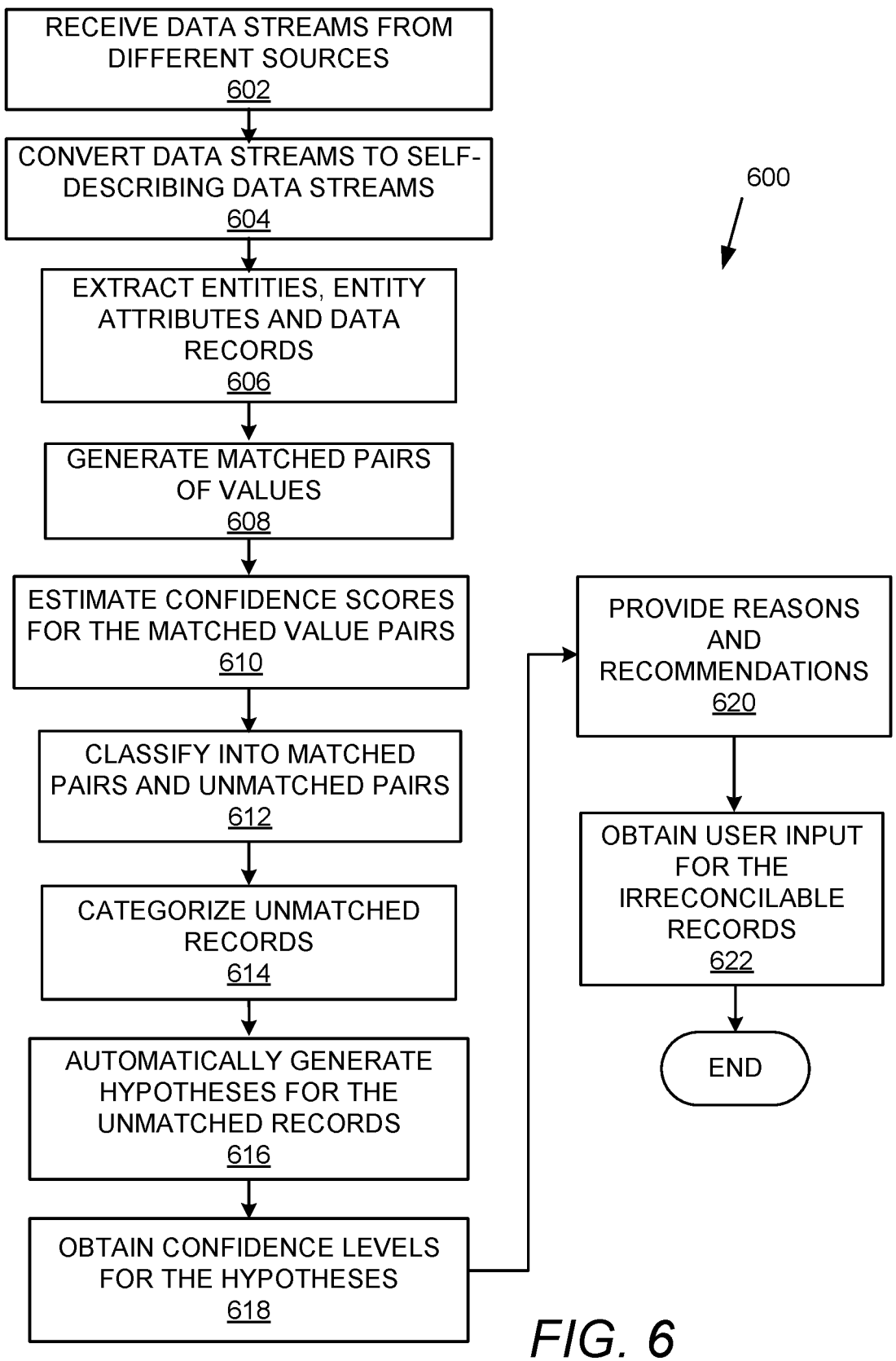
FIG. 6 is a flowchart that details a method of data reconciliation that can be implemented by the data reconciliation system in accordance with examples disclosed herein.

FIG. 6 is a flowchart 600 that details a method of data reconciliation that can be implemented by the data reconciliation system 100 in accordance with examples disclosed herein. The method begins at 602 wherein at least two data streams including a first data stream and a second data stream from two different data systems are received for reconciliation of the data records. The two different systems can include at least a source data system or a first data system and a target data system or a second data system. If more than two data streams are received from multiple data systems, then higher order matches are implemented wherein the data is matched to an intermediate data stream and the intermediate data stream is matched to the second data stream. More than one intermediate data streams can be similarly processed so that one intermediate data stream is matched to another intermediate data stream. In an example, the intermediate data streams can include sub-ledgers under general ledgers. The data streams received at 602 can include documents in different formats (.pdfs, .docs etc.), spreadsheets, presentations, emails, webpages, scanned images, sound or video files and the like. In the case where more than one intermediate data stream is processed, the matching order for the data streams can be gathered from subject matter experts (SMEs) and configure with the data reconciliation system 100. In general, the data reconciliation system 100 initially executes contextual based matching wherein multiple field combinations are first matched followed by amount based matching. For example, in the case of amounts in an invoice versus a purchase order, the strings identifying the total amounts in the documents are first matched followed by the actual numbers representing the total amounts.

The received data streams are converted to respective self-describing data streams at 604. The self-describing data streams can include data records or line items from the at least two data streams received at 602 in addition to data models that describe the entities and the entity attributes from the at least two data streams. In an example, the data streams can be converted to JSON format at 604. If intermediate data streams are used then such data streams are also converted to respective intermediate self-describing data streams. The entities and entity attributes are extracted from the data streams at 606. The entities can include the various elements referred to in the information received in the data streams. Entities can include customers, amounts, dates, descriptions, account numbers etc. Attributes of a customer entity, for example, can include the customer's name, the customer account number, important dates associated with the customer, pending invoices, average transaction amounts and the like. Similar attributes can be defined for other entities. The data records or line items can provide values for one or more of the entity attributes. As the databases evolve or grow, the data source location could also evolve over time. The data reconciliation system 100 implements semantic-based data source specification. As an example, specification of a bank statement as "XYZ bank, Account#12345, September" can be more robust than specifying a file location. The semantic-based data source location is not subject to changes. In an example, locations of the respective data records are included within the at least two self-describing data streams as semantic based data source specifications.

The value pairs are compared and mapped from one data stream to another at 608 which can include one-to-one, many-to-one, one-to-many, many-to-many, a self-match and a prior period matches. In an example, each value or data record from the first self-describing data stream 126 can be mapped to each value in the second self-describing data stream 128. A respective confidence score is estimated at 610 for each pair of values matched at 608. The confidence score can be indicative of the extent of matching between the pair of values. The confidence score can be estimated based on a number of factors such as but not limited to, the data types being matched, the extent of matching necessary for the match, the actual extent to which the compared values match (e.g., in terms of data formats, data types etc.) and the like. For example, when estimating the match between values, a factor is added to the confidence score if the matched values are of similar data types e.g., strings, further weight can be added to the confidence score based on the number of matching characters and the order in which the characters are arranged. The confidence score can include another factor which is indicative of the extent to which match is necessary for that entity/entity attribute. For example, if the entity is the name of entity, a high value can be assigned to the extent of matching. If the values being compared relate to a common entity name such as 'Account No.' then lesser value can be assigned as "Account No.", "A/C No." or other variations do not make substantial difference.

The confidence scores associated with the mapped pairs are compared with a predetermined confidence score threshold and the mapped pairs of values are classified into matched pairs and unmatched or mismatched pairs at 612. At 614 the unmatched records are categorized into one or more of the reason categories 136 using for example, text or string matching techniques and the like. A subset of the unmatched records which could not be categorized into any of the reason categories 136 are collected as irreconcilable records 118. At 616, one or more hypotheses can be automatically generated for the discrepancies which result in the unmatched records 117. The hypotheses can be based on various factors including but not limited to, the entities/entity attributes which did not match, the rules or portions of the rules which were not met by the corresponding records, the factors causing the unmatched records 117 to fail to meet the predetermined confidence score threshold. At 618, the confidence levels for the various hypotheses are obtained. For those unmatched records 117 having hypotheses with high confidence levels, the reasons for the discrepancies and the recommendations to correct the discrepancies are provided at 620. The unmatched records 117 corresponding to hypotheses with low to medium confidence levels are flagged or categorized within the irreconcilable records 118. The user input is obtained at 622 for the flagged irreconcilable records. The user input enables further training the data reconciliation system 100. In an example, the user input can add to or change one or more of the custom dictionary 134, the rules of data reconciliation 132 and the reason categories 136.

Figure 7:
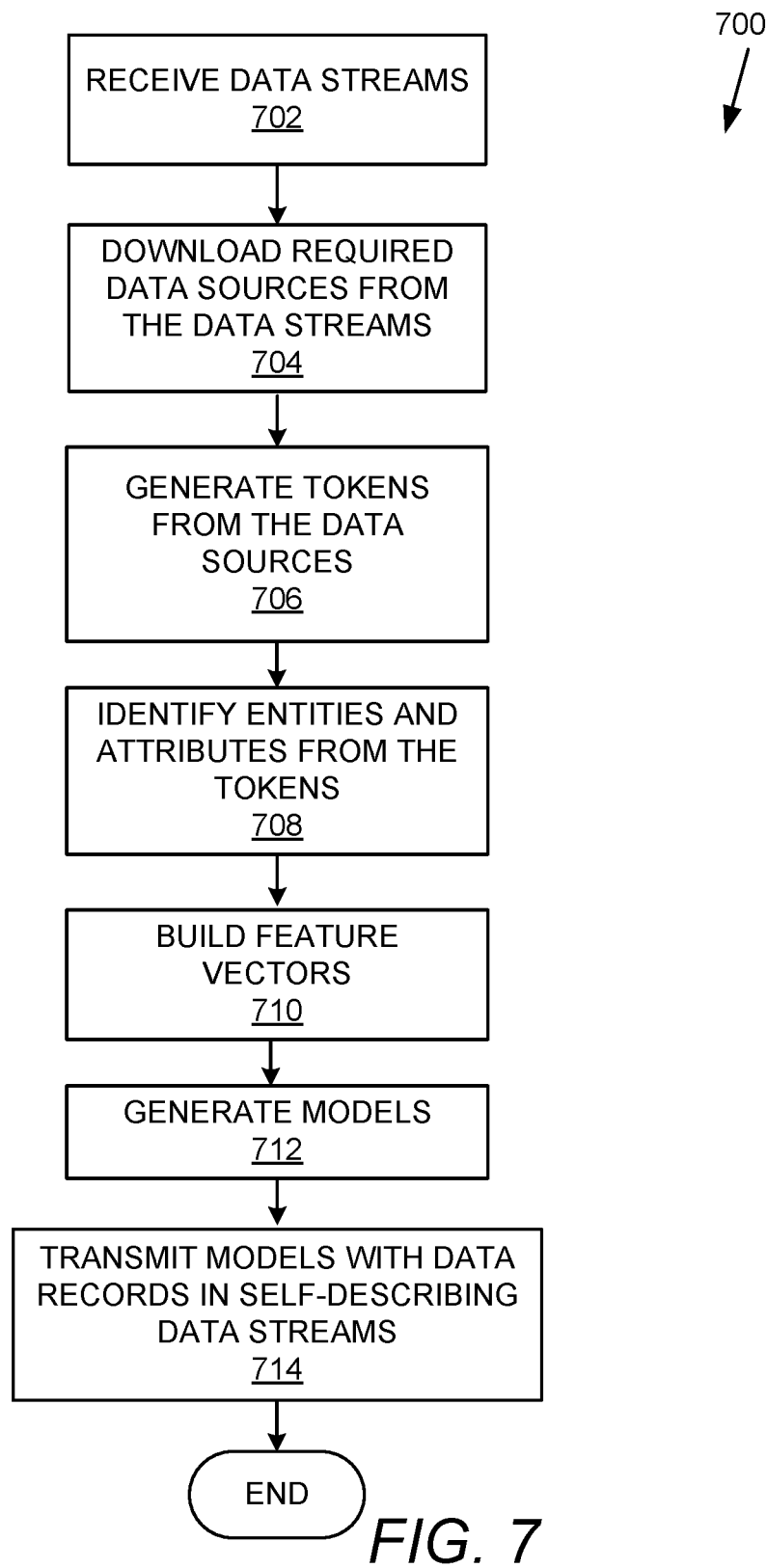
FIG. 7 is a flowchart that details a method of converting data streams into self-describing data streams in accordance with examples disclosed herein.

FIG. 7 is a flowchart 700 that details a method of converting the data streams into self-describing data streams in accordance with examples disclosed herein. Self-describing data has the schema or structure is embedded in the data itself. The schema is comprised of metadata such as element names, data types, compression/encoding scheme used (if any), statistics etc. There are a variety of data formats including JSON, XML, Parquet and NoSQL databases such as HBase that provide for self-describing data and typically vary in the level of their own metadata is exposed. As the schema or data model is transmitted with the data, the data reconciliation system 100 receiving such data needs no prior information regarding the data.

The data streams 122 and 124 for data reconciliation are received by the data reconciliation system 100 at 702. The required documents or data sources such as invoices, statements, purchase orders and the like needed for data reconciliation are downloaded by the data reconciliation system 100. The data sources can be of various formats including spreadsheets, database tables, computer-readable documents, scanned images and the like. Based on the type of data sources, various techniques such as but not limited to OCR, parsing, filtering, stop word removal, stemming, POS tagging and the like can be employed to generate tokens from the received data sources at 706. The entities and attributes of the entities are identified at 708 using the custom dictionary 134. The entities and entity attributes are used to build feature vectors at 710. The feature vectors can be used to generate data models 146 and 148 at 712. In an example, the data models 146, 148 detail the metadata or data schema using JSON, XML and the like. The models 146, 148 thus generated are transmitted with the data records received in the data streams 122, 124 as self-describing data streams 126 and 128 at 714.

Figure 8:
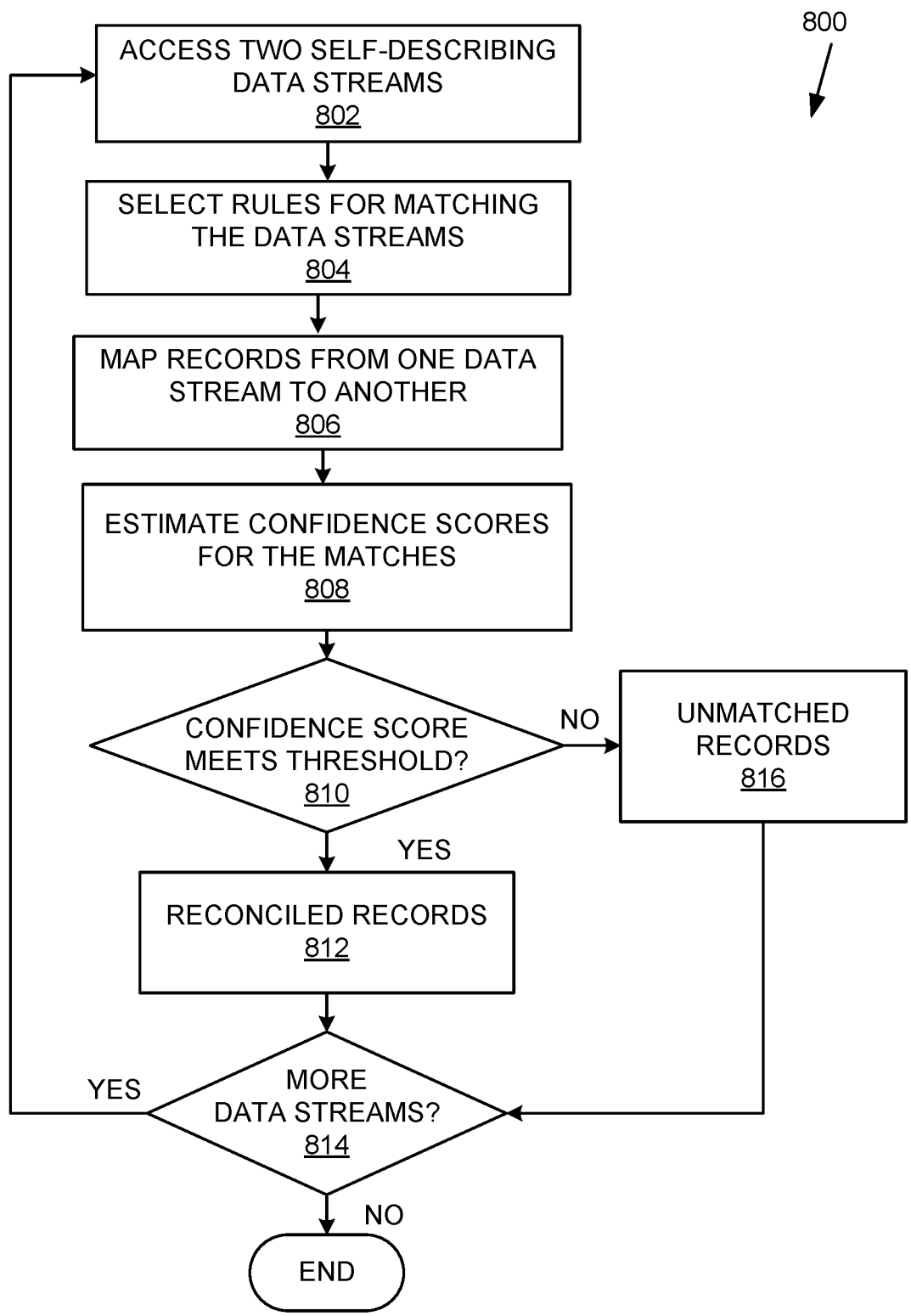
FIG. 8 is a flowchart that details a method of data reconciliation in accordance with examples disclosed herein.

FIG. 8 is a flowchart 800 that details a method of data reconciliation in accordance with examples disclosed herein. The method begins at 802 with the data reconciliation system 100 accessing two self-describing data streams. Based on the entities and entity attributes extracted from the self-describing data streams, the rules of the data reconciliation 132 are retrieved. The data reconciliation system 100 provides a centralized resource of data reconciliation for multiple processes and hence, the rules of data reconciliation 132 can include rules for matching entities from the various processes. Alternately, the rules for data reconciliation 132 define the conditions and/or provide the operators to be used for particular entities when matching the corresponding values or data records. In an example, the entities extracted from the self-describing data streams can be used to select the subset of the rules to be applied for matching the values from the two self-describing data streams at 804.

The values or data records from one self-describing data stream are matched to the data records of another self-describing data stream at 806 in accordance with the rules selected at 804. In an example, the rules of data reconciliation 132 can be framed in a natural language. The selected rules can be parsed and interpreted to execute the data reconciliation. As mentioned herein, the rules can require mathematical, logical, or string manipulation operations. Each data record of a self-describing data stream can be matched to each data record of another self-describing data stream. The confidence scores associated with the matches are estimated at 808 based on the degree to which the matched data records comply with the selected rules. The confidence scores convey the degree or extent of matching between the two data records. At 810, the confidence scores for each matched pair of values is compared with a predetermined threshold. If it is determined at 810 that the confidence score of a matched value pair meets the threshold, the method proceeds to 812 wherein the value pair is classified as a reconciled pair. In the case of higher order matches including 3-way or 4-way matches, it is further determined at 814 if more self-describing data streams remain to be processed. If it is determined at 810 that the confidence score of the matched value pair does not meet the threshold the data records or values in the pair are categorized as unmatched records. The method proceeds to 814 to determine if further data streams remain for mapping. If yes, the method returns to 802 to access the next pair of data streams. If it is determined at 814 that no further data streams remain for processing the method terminates on the end block.

Figure 9:
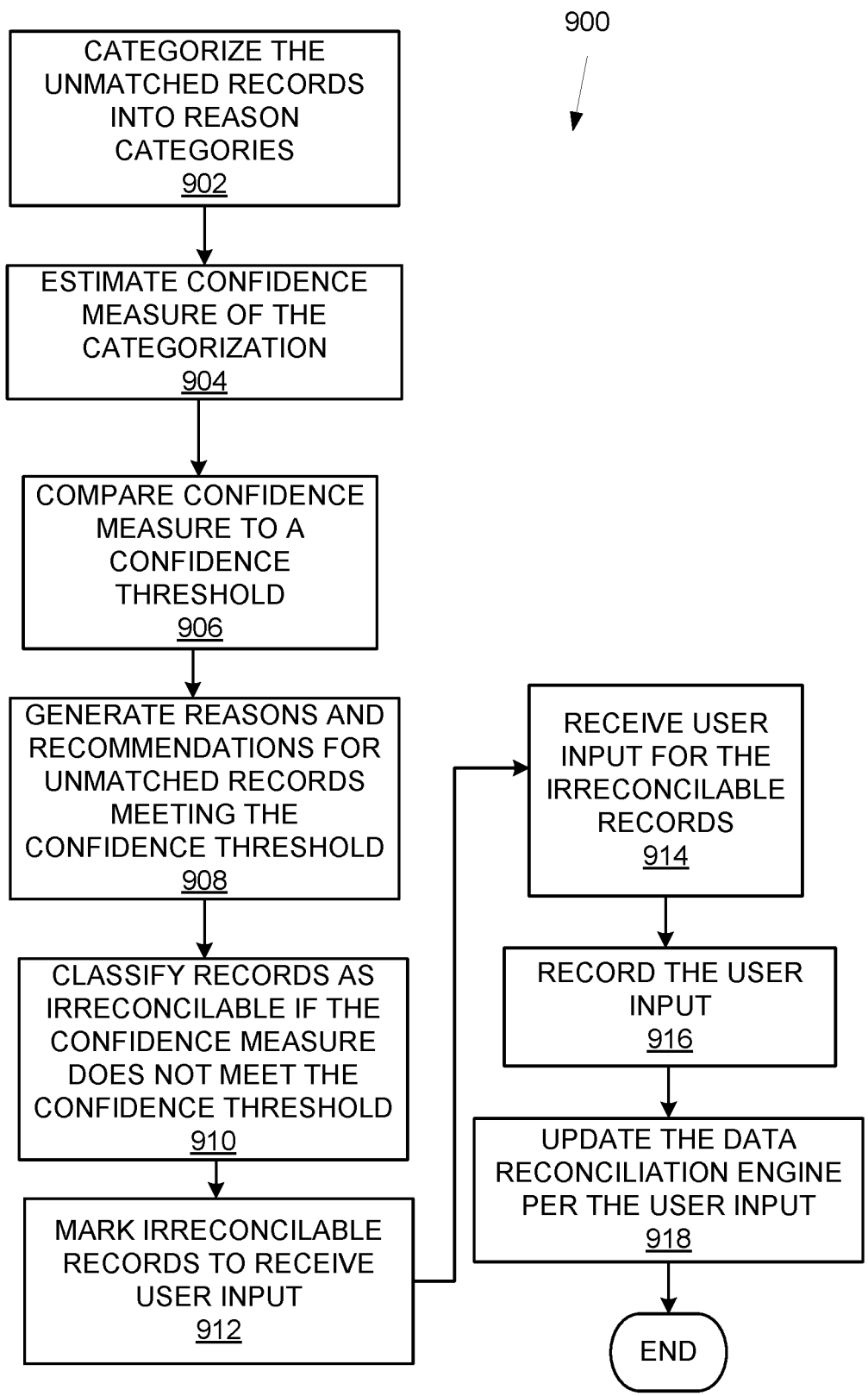
FIG. 9 details a method of processing irreconcilable records in accordance with examples disclosed herein.

FIG. 9 details a method of processing irreconcilable records in accordance with examples disclosed herein. The method begins at 902 wherein the unmatched records 117 are sorted into reason categories. In an example, AI techniques such as classifiers can be employed to classify the various unmatched records 117 into one or more of the reason categories 136. A hypotheses confidence level for the categorization of the unmatched records 117 into the reason categories 136 is estimated at 904. The hypotheses confidence level is compared to a hypotheses confidence threshold at 906. The reasons for the unmatched records and a recommendations corresponding to the mismatched record can be generated at 908 and communicated to a user if the confidence measure is greater than the confidence threshold. If the hypotheses confidence level does not meet the hypotheses confidence threshold then the records are classified as irreconcilable records at 910. The irreconcilable records 118 are marked to receive user input for reconciliation at 912. When the user input for the irreconcilable records 118 is received at 914, then such user input is recorded at 916 and used for further training the data reconciliation system 100 at 918. It can be appreciated that the user input can also include input which marks matched up records as being erroneously matched or mismatched. The user input can be used to update for example, one or more of the rules of data reconciliation 132, the custom dictionary 134 and the reason categories 136.

Figure 10:
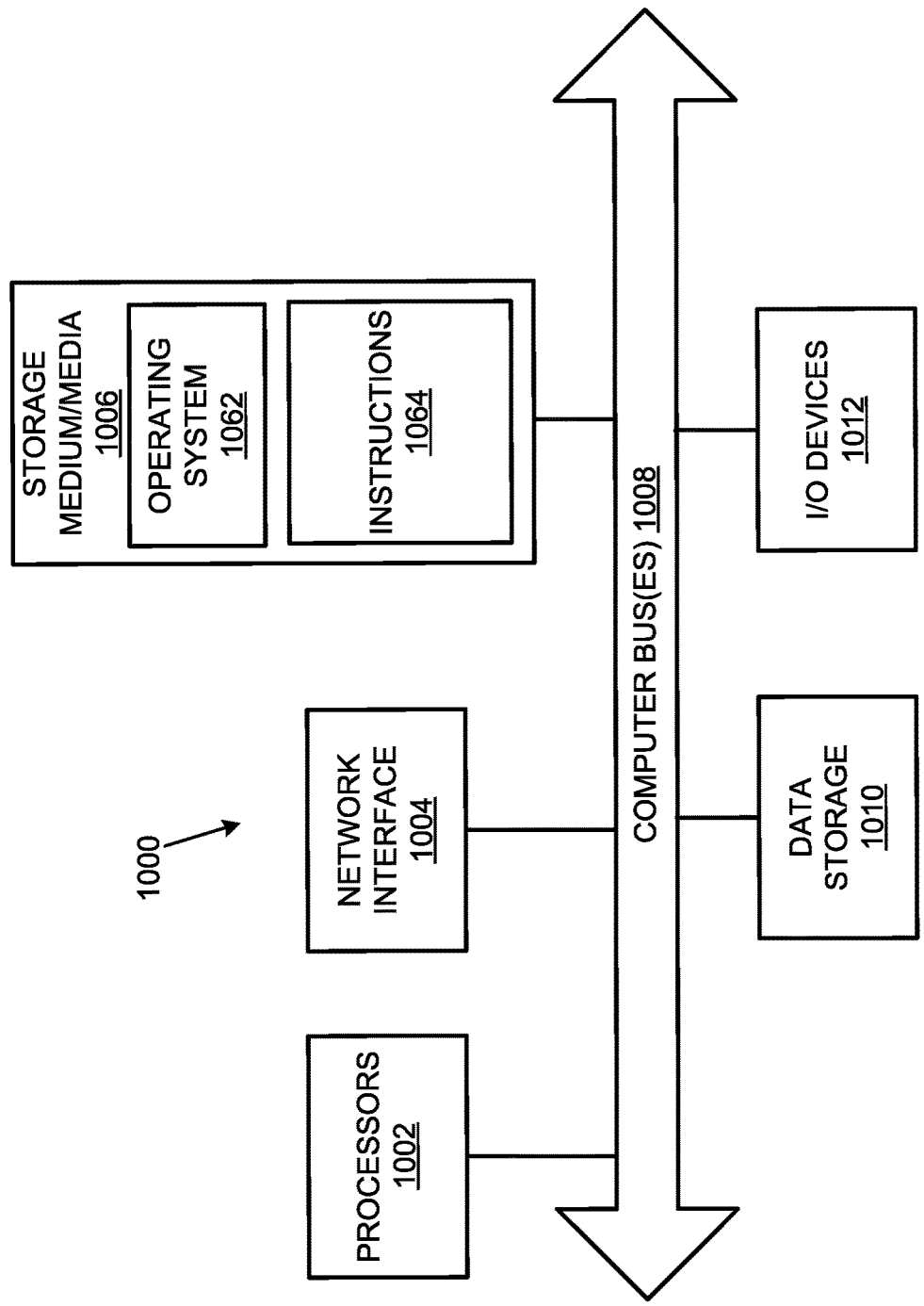
FIG. 10 illustrates a computer system that may be used to implement the data reconciliation system.

FIG. 10 illustrates a computer system 1000 that may be used to implement the data reconciliation system 100. More particularly, computing machines such as desktops, laptops, smartphones, tablets, wearables which may be used to generate or access the data from the data reconciliation system 100 may have the structure of the computer system 1000. The computer system 1000 may include additional components not shown and some of the components described may be removed and/or modified. In another example, a computer system 1000 can sit on external-cloud platforms such as, Amazon Web Services, or internal corporate cloud computing clusters, or organizational computing resources, etc.

The computer system 1000 includes processor(s) 1002, such as a central processing unit, ASIC or other type of processing circuit, input/output devices 1012, such as a display, mouse keyboard, etc., a network interface 1004, such as a Local Area Network (LAN), a wireless 802.11x LAN, a 3G or 4G mobile WAN or a WiMax WAN, and a computer-readable medium 1006. Each of these components may be operatively coupled to a bus 1008. The computer-readable medium 1006 may be any suitable medium which participates in providing instructions to the processor(s) 1002 for execution. For example, the computer-readable medium 1006 may be non-transitory or non-volatile medium, such as a magnetic disk or solid-state non-volatile memory or volatile medium such as RAM. The instructions or modules stored on the computer-readable medium 1006 may include machine-readable instructions 1064 executed by the processor(s) 1002 to perform the methods and functions of the data reconciliation system 100

The data reconciliation system 100 may be implemented as software stored on a non-transitory computer-readable medium and executed by the one or more processors 1002. For example, the computer-readable medium 1006 may store an operating system 1062, such as MAC OS, MS WINDOWS, UNIX, or LINUX, and code 1064 for the data reconciliation system 100. The operating system 1062 may be multi-user, multiprocessing, multitasking, multithreading, real-time and the like. For example, during runtime, the operating system 1062 is running and the code for the data reconciliation system 100 is executed by the processor(s) 1002.

The computer system 1000 may include a data storage or non-transitory computer readable storage medium 1010, which may include non-volatile data storage. The data storage 1010 stores data used by the data reconciliation system 100 The data storage 1010 may be used to the data records to be matched, the matched and unmatched data records, the confidence values, the confidence thresholds and the like.

The network interface 1004 connects the computer system 1000 to internal systems for example, via a LAN. Also, the network interface 1004 may connect the computer system 1000 to the Internet. For example, the computer system 1000 may connect to web browsers and other external applications and systems via the network interface 1004.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents.

What is claimed is:

1. A centralized data reconciliation system, comprising:
    at least one processor;
    at least one non-transitory data storage storing thereon an custom dictionary that includes tokens associated with a first self-describing data stream and a second self-describing data stream, the tokens used for the data matching and the custom dictionary being dynamically updateable based on data streams that are received by the data reconciliation system; and
    at least one non-transitory computer readable medium storing machine-readable instructions that cause the at least one processor to:
    convert at least two data streams originating at a first data system and a second data system into respective at least two self-describing data streams including the first self-describing data stream and the second self-describing data stream, wherein the first self-describing data stream includes respective data records and a first data model and the second self-describing data stream includes respective data records and a second data model;
    map the data records in the first self-describing data stream that include entities and entity attributes to entities and entity attributes in the data records of the second self-describing data stream by employing one or more of the custom dictionary and rules of data reconciliation via one or more two-way matchings;
    generate respective confidence scores for the mappings wherein the confidence scores indicate a degree of matching between the mapped data records based at least on rules of data reconciliation;
    identify one or more of the data records in the second self-describing data stream that match one or more of the data records in the first self-describing data stream from the mappings based at least on the confidence scores;
    determine unmatched data records from the data records from the first and the second self-describing data streams based at least on the confidence scores;
    classify the unmatched data records into categorized records and irreconcilable records, the categorized records are categorized into one or more reason categories, and the irreconcilable records including the unmatched data records that could not be categorized into the reason categories;
    generate one or more of reasons and recommendations for at least a subset of the categorized records; and
    automatically update one or more of the custom dictionary, the reason categories and the rules of data reconciliation based on user inputs received for the irreconcilable records for which the reasons and recommendations could not be generated.

2. The centralized data reconciliation system of claim 1, the first data model and the second data model include one or more of entity names, data types and compression schemes used.

3. The centralized data reconciliation system of claim 1, wherein the non-transitory computer readable medium further storing machine-readable instructions that cause the at least one processor to:
    extract entities and attributes of the entities from the data records of the first self-describing data stream and the second self-describing data stream using natural language processing (NLP) techniques.

4. The centralized data reconciliation system of claim 3, wherein the non-transitory computer readable medium further storing machine-readable instructions that cause the at least one processor to:
    map one or more attributes of the entities in the first self-describing data stream to one or more attributes of the entities in the second self-describing data stream, the mapping provided by the custom dictionary.

5. The centralized data reconciliation system of claim 4, wherein the non-transitory computer readable medium further storing machine-readable instructions that cause the at least one processor to:
    retrieve the rules of data reconciliation that are employed to match entities from the first self-describing data stream to entities in the second self-describing data stream, the matching of data records based at least on one of the entity attributes; and
    generate a respective one of the confidence scores for each of the mappings.

6. The centralized data reconciliation system of claim 1, wherein the at least two self-describing data streams include at least three self-describing data streams including the first self-describing data stream, the second self-describing data stream and an intermediate self-describing data stream and wherein the non-transitory computer readable medium further storing machine-readable instructions that cause the at least one processor to:
    decompose a three-way matching process between the first self-describing data stream to the intermediate data stream and to the second self-describing data stream to two two-way matching processes.

7. The centralized data reconciliation system of claim 1, wherein the instructions for identifying matching data records from the mappings further comprise machine-readable instructions that cause the at least one processor to:
    compare the confidence scores for categorizing the mappings into the matched records and the unmatched data records, the matched data records having the respective confidence scores above a first confidence threshold and the unmatched data records having the respective confidence scores below the first confidence threshold.

8. The centralized data reconciliation system of claim 1, the non-transitory computer readable medium storing machine-readable instructions that cause the at least one processor to:
    record user input regarding user actions pertaining to the irreconcilable records; and
    provide the user input for training the data reconciliation system in resolving the irreconcilable records.

9. The centralized data reconciliation system of claim 8, wherein the non-transitory computer readable medium further storing machine-readable instructions that cause the at least one processor to:

flag for human review the irreconcilable records based on a comparison of respective second confidence levels of the unmatched data records with a second confidence threshold.

10. The centralized data reconciliation system of claim 1, wherein the non-transitory computer readable medium further storing machine-readable instructions that cause the at least one processor to:
receive user feedback to results output by the centralized data reconciliation system.

11. The centralized data reconciliation system of claim 10, wherein the non-transitory computer readable medium further storing machine-readable instructions that cause the at least one processor to:
update one or more of the custom dictionary, the rules of data reconciliation and reason categories based at least on the user feedback.

12. The centralized data reconciliation system of claim 1, wherein locations of the respective data records are included within the at least two self-describing data streams as semantic based data source specifications.

13. A method for data reconciliation comprising:
receiving at least two data streams including at least a first data stream and a second data stream from a first data system and a second data system respectively;
building respective feature vectors from the first data stream and the second data stream;
converting the first data stream and second data stream into respective self-describing data streams that each includes a respective data model based on the feature vectors;
extracting entities and attributes of entities to be matched from the self-describing data streams using the respective data models;
mapping the entities from a first one of the self-describing data streams to a second one of the self-describing data streams by employing an custom dictionary that enables mapping the entities in one or more two-way matches using rules of data reconciliation;
estimating a confidence score for each of the mappings;
identifying matched records and unmatched records from the mappings based on a comparison of the confidence scores with a confidence score threshold;
categorizing a subset of the unmatched records into one or more reason categories and another subset of the unmatched records that could not be categorized as irreconcilable records;
framing one or more hypotheses and a respective discrepancy confidence score for each of the hypotheses, the discrepancy confidence score being indicative of a confidence level of the hypotheses for the categorized records based on one or more of the rules of data reconciliation that were not fulfilled by the irreconcilable records; and
generating a report including one or more of a reason and a recommendation for the categorized records having the respective discrepancy confidence scores above a confidence threshold; and
flagging for user intervention, the irreconcilable records having the respective discrepancy confidence scores below a confidence threshold.

14. The method for data reconciliation of claim 13 further including:
recording user input received for one or more of the irreconcilable records having the respective confidence scores below the confidence threshold and the matched records.

15. The method of claim 13, wherein converting the at least two data streams into respective self-describing data streams further comprises:
generating for the self-describing data streams respective data models including the entities and the attributes of the entities; and
including with the self-describing data streams, the respective data models.

16. The method of claim 13, wherein extracting entities and attributes of entities further comprises:
employing one or more of text matching and natural language processing (NLP) techniques for mapping the entities from the first data stream to the entities in the second data stream.

17. The method of claim 13, wherein the at least two data streams include four data streams and matching the entities from the first self-describing data stream to the second self-describing data stream further comprises:
decomposing a match between the first self-describing data stream and the second self-describing data stream into three two-way matches that include at least a mapping from the first self-describing data stream to a first self-describing intermediate data stream and another mapping from a second self-describing intermediate data stream to the second self-describing intermediate data stream.

18. A non-transitory computer-readable storage medium comprising machine-readable instructions that cause a processor to:
convert at least two data streams including a first data stream and a second data stream originating respectively at a first data system and a second data system into respective self-describing data streams including a first self-describing data stream and a second self-describing data stream, wherein the first self-describing data stream includes respective data records and a first data model and the second self-describing data stream includes respective data records and a second data model;
map the data records in the first self-describing data stream that include entities and entity attributes to entities and entity attributes in the data records of the second self-describing data stream by employing one or more of an custom dictionary and rules of data reconciliation via one or more two-way matchings;
generate respective confidence scores for the mappings wherein the confidence scores indicate a degree of matching between the mapped data records based at least on rules of data reconciliation;
identify one or more of the data records in the second self-describing data stream that match one or more of the data records in the first self-describing data stream from the mappings based at least on the confidence scores;
determine unmatched data records from the data records from the first and the second self-describing data streams based at least on the confidence scores;
classify the unmatched records into categorized records and irreconcilable records, the categorized records being categorized into one or more reason categories, and the irreconcilable records include the unmatched data records that could not be categorized into the reason categories;
generate one or more of reasons and recommendations for at least a subset of the irreconcilable records; and
automatically update one or more of the custom dictionary, the reason categories and the rules of data reconciliation based on user inputs received for the irreconcilable records for which the reasons and recommendations could not be generated.

19. A non-transitory computer-readable storage medium of claim 18, wherein the instructions for converting the at least two data streams further comprising machine-readable instructions that cause a processor to:
  build respective feature vectors from the first data stream and the second data stream; and
  convert the first and second data streams into respective the self-describing data streams that each includes a respective data model based on the feature vectors.

20. A non-transitory computer-readable storage medium of claim 18, wherein the instructions for mapping the data records further comprising machine-readable instructions that cause a processor to:
  employing one or more of text matching and natural language processing (NLP) techniques for mapping the entities from the first data stream to the entities in the second data stream.

* * * * *